(12) United States Patent
Yoon et al.

(10) Patent No.: US 8,639,968 B2
(45) Date of Patent: Jan. 28, 2014

(54) COMPUTING SYSTEM RELIABILITY

(75) Inventors: Doe Hyun Yoon, Austin, TX (US);
Naveen Muralimanohar, Santa Clara, CA (US); Jichuan Chang, Sunnyvale, CA (US); Parthasarathy Ranganathan, San Jose, CA (US); Norman Paul Jouppi, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 479 days.

(21) Appl. No.: 13/007,741

(22) Filed: Jan. 17, 2011

(65) Prior Publication Data
US 2012/0185727 A1 Jul. 19, 2012

(51) Int. Cl.
*G06F 11/00* (2006.01)

(52) U.S. Cl.
USPC .......................................................... 714/6.1

(58) Field of Classification Search
USPC .......................................................... 714/6.1
See application file for complete search history.

(56) References Cited

U.S. PATENT DOCUMENTS

| | | | |
|---|---|---|---|
| 5,734,814 A * | 3/1998 | Corbin et al. | 714/6.22 |
| 6,052,799 A | 4/2000 | Li et al. | |
| 6,513,093 B1 | 1/2003 | Chen et al. | |
| 6,567,889 B1 | 5/2003 | DeKoning et al. | |
| 7,222,135 B2 * | 5/2007 | Corrado et al. | 707/809 |
| 7,370,248 B2 | 5/2008 | Tapper et al. | |
| 7,426,611 B1 * | 9/2008 | Gupta et al. | 711/119 |
| 7,694,086 B1 * | 4/2010 | Bezbaruah et al. | 711/162 |
| 7,721,143 B2 | 5/2010 | Humlicek | |
| 2005/0050304 A1 * | 3/2005 | Mukherjee et al. | 712/218 |
| 2005/0050307 A1 * | 3/2005 | Reinhardt et al. | 712/227 |
| 2009/0044043 A1 | 2/2009 | Cherian et al. | |
| 2011/0184967 A1 * | 7/2011 | Reiter et al. | 707/758 |
| 2012/0110259 A1 * | 5/2012 | Mills et al. | 711/113 |
| 2012/0166723 A1 * | 6/2012 | Araki et al. | 711/113 |
| 2012/0239624 A1 * | 9/2012 | Barnes et al. | 707/645 |

FOREIGN PATENT DOCUMENTS

EP 802485 A1 * 10/1997 .............. G06F 12/08

OTHER PUBLICATIONS

Unknown., "Checkpointing Research at Tennessee", Retrieved from http://web.eecs.utk.edu/~plank/ckp.html, 4 pages.
Anderson et al., Eric, "Efficient eventual consistency in Pahoehoe, an eraure-coded key-blob archive", Proceedings of DSN 2010, The 40th Annual IEEE/IFIP International Conference on Dependable Systems and Networks, Jun. 28-Jul. 1, 2010, Chicago, IL, 10 pages.
Welch et al., Brent, "Scalable Performance of the Panasas Parallel File System", FAST '08: 6th USENIX Conference on File and Storage Technologies, pp. 17-33.
Qureshi et al., Moinuddin K., "Line Distillation: Increasing Cache Capacity by Filtering Unused Words in Cache Lines", Department of Electrical and Computer Engineering, The University of Texas at Austin, Published 2007, pp. 250-259.
Ghemawat et al., Sanjay, "The Google File System", SOSP'03, Oct. 19-22, 2003, Bolton Landing, New York, USA, 15 pages.
Dong et al., Xiangyu, "Leveraging 3D PCRAM Technologies to Reduce Checkpoint Overhead for Future Exascale Systems", SC09, Nov. 14-20, 2009, Portland, Oregon, USA, 12 pages.

* cited by examiner

*Primary Examiner* — Bryce Bonzo

(57) ABSTRACT

Systems, methods, and computer-readable and executable instructions are provided for computing system reliability. A method for computing system reliability can include storing, on one of a plurality of devices, a checkpoint of a current state associated with the one of the plurality of devices. The method may further include storing the checkpoint in an erasure-code group across the plurality of devices.

12 Claims, 4 Drawing Sheets

COMPUTING SYSTEM RELIABILITY

BACKGROUND

In a large scale computing system, failures frequently happen, and checkpointing may be used to improve reliability for a system. Computing systems may employ checkpointing to insert fault tolerance into the system. Computing systems may employ local checkpointing schemes and global checkpointing schemes. A Redundant Array of Independent Disks (RAID) may also be used to insert fault tolerance into a system. A RAID may be used to increase storage reliability through redundancy by combining disk drive components into a logical unit where drives in an array may be interdependent. A. RAID may include computer data storage schemes that can divide and/or replicate data among multiple disk drives.

DETAILED DESCRIPTION

Figure 1:
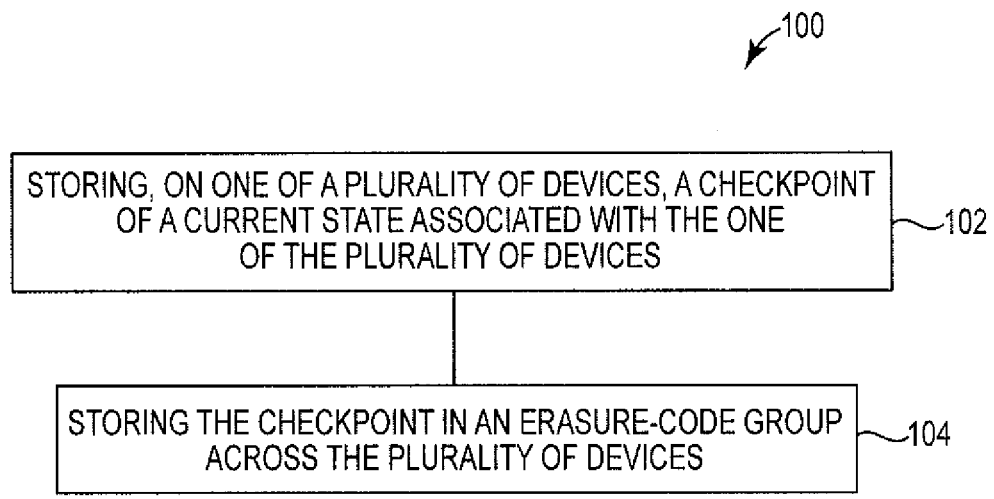
FIG. 1 is a flow chart illustrating an example of a method for computing system reliability according to the present disclosure.

Examples of the present disclosure may include methods, systems, and computer-readable and executable instructions and/or logic. An example method for computing system reliability may include storing, on one of a plurality of devices, a checkpoint of a current state associated with the one of the plurality of devices. The method may further include storing the checkpoint in an erasure-code group across the plurality of devices.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 314 may reference element "14" in FIG. 3, and a similar element may be referenced as 414 in FIG. 4. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Computing systems can employ checkpointing to insert fault tolerance into a system for use in failure response. Checkpointing allows for the storage of a snapshot of a current application state that can later be used for restarting an execution in case of failure. A process can take a snapshot, occasionally by saving its state to a database. This snapshot can be saved as a local state of a process, which can be referred to as a "checkpoint." When a failure occurs, the process can roll back to its most recent checkpoint. The process can assume the state saved in that checkpoint and resume execution.

Checkpointing can include local and global checkpointing. Computing systems can employ local checkpoints to recover from transient failures (e.g., a soft error in the memory array that will not persist after reboot) and global checkpoints to recover from permanent failures (e.g., a socket or server component that fails even after reboot). Local checkpointing can include storing, on a device, a checkpoint of a current state associated with the device. Global checkpointing has wider coverage than local checkpointing, but it incurs higher overhead. Global checkpointing can incur 100% storage overhead because each memory state is duplicated and stored. Furthermore, unlike local checkpoints that are confined to a node, global checkpointing competes with workload for network bandwidth. If a system has multiple machines or devices, each device can have local checkpoints, and to protect from a complete failure of a node, the system as a whole can have one or more global consistent states or global checkpoints.

A RAID is a technique that allows for storing the same data in different places on multiple hard disks. RAID may be an example of erasure-code, without loss of generality. An erasure code may provide redundancy without the overhead of strict replication by dividing an object into a first number of fragments and recoding them into a second number of fragments. While RAID technology can be used for both improving performance and resiliency, it is used in the present disclosure to refer to improved reliability. Multiple devices can be set up in a RAID array, and the array can distribute data across multiple disks. The array can be addressed by an operating system as one single device. A RAID can also employ an error protection method called "parity." Parity can provide fault tolerance in a given set of data using "exclusive or" Boolean logic techniques. A hybrid scheme of local checkpointing and RAID technology can reduce the space and communication overhead for application checkpoint schemes in a data center.

A RAID can also employ mirroring error protection schemes and striping error protection schemes. In a mirroring technique, whatever is written to one drive can be written (e.g., simultaneously) to a second drive. Each piece of data can have a duplicate on the second drive. In a striped array, data is interleaved across all the drives in the array. A striping technique can not provide redundancy, and if one drive in the array fails, all data can be lost (e.g., without the use of parity data).

FIG. 1 is a flow chart illustrating an example of a method 100 for computing system reliability according to the present disclosure. Combining local checkpointing and erasure-code protection (e.g., RAID protection) for checkpoint states can protect a computing system from both transient and permanent failures with lower space than is found in global checkpointing that simply replicates data. The method 100 can be used in main memory protection, but without loss of generality, the method 100 can also be used for persistent store, such as file systems. Furthermore, the method 100 can be directly applied to massively parallel processors (MPP) or clustered system for main memory checkpointing. The method 100 can provide socket-, server-, and rack-level protection.

At 102, a checkpoint of a current state associated with one of a plurality of devices is stored on that device. In an example of a main memory checkpoint scheme, a line is written into main memory to part of a checkpoint state. The line can be a line that is incoherent, or it can be the only copy of the line (e.g., dirty line). The line can be written to a data as part of a checkpoint state associated with one of a plurality of devices. In response, a copy of the checkpoint state can be sent to a reserved region called a log buffer, and the write can proceed. The log buffer can be RAID protected across servers. In a further example, virtual memory based copy-on-write data pages can be declared as read-only, and a first write to this read-only region can raise an exception. An operating system can copy the read-only data page, and the copied page can be set to writable. Other mechanism, such as a multi-versioned data structure can be used.

Many RAID levels can be used as data storage schemes that can divide and replicate data among multiple disks. RAID protection (e.g., parity protection) of the log buffer can require updating the parity information on a remote parity node. Parity protection can take multiple forms (e.g. checksum RAID, XOR parity). For example, in a checksum parity technique, a parity byte can be added to information being written to an array. A number of parity bytes can be added together to equal either an even or an odd number. This number can then be analyzed to determine whether the information was compromised. If it was compromised, the data can be reconstructed automatically with data from a different location.

An update to global checkpointed-RAID state can be part of the log buffer update operation, and it can be triggered on a per-update basis following RAID protocol. This per-update technique can result in poor performance and increased communication overhead. Instead, multiple log buffer updates can be aggregated into one commit operation to reduce performance and communication overheads. This can be triggered either implicitly by run-time system/operating system or explicitly by a commit operation of applications. The commit operation aggregate may be sent when committing a logical transaction (e.g., a database transaction). The commit operation aggregate may also be sent during software synchronization points (e.g., the join phase of a fork-join based parallel program).

At 104, the checkpoint is stored in an erasure-code group across the plurality of devices. An erasure code may be a forward error correction code for a binary erasure channel, which may transform a message of a first number of symbols into a longer message (code word) with a second number of symbols such that the original message can be recovered from a subset of the second number of symbols. In an example, the erasure code is a superset of a RAID system and includes a RAID. The checkpoint can be stored in a RAID across the plurality of devices. In a database transaction operation, a parity update (e.g., XOR) can be performed only when committing a transaction. In a fork-join based parallel program, log buffer updating can occur only during the join phase. A group update can include scanning the log buffer and associated new data to generate group parity information between old and new data. This group parity data can be sent to a parity node to update the parity. The parity node can send an acknowledgement, and the log buffer can be discarded. Adding operating system or application clues can further assist aggregation or batching of RAID updates.

The amount of communicated parity information can be reduced by excluding temporary data in stack or heap (with operating system or software hints). This may be reduced using a flag in a page table entry. The amount of information can be also be reduced by a bulk transfer with a group update to amortize meta-data overhead. Furthermore, excluding an unmodified fraction of a cache line with hardware assist can also reduce the amount of communicated parity information.

Figure 2:
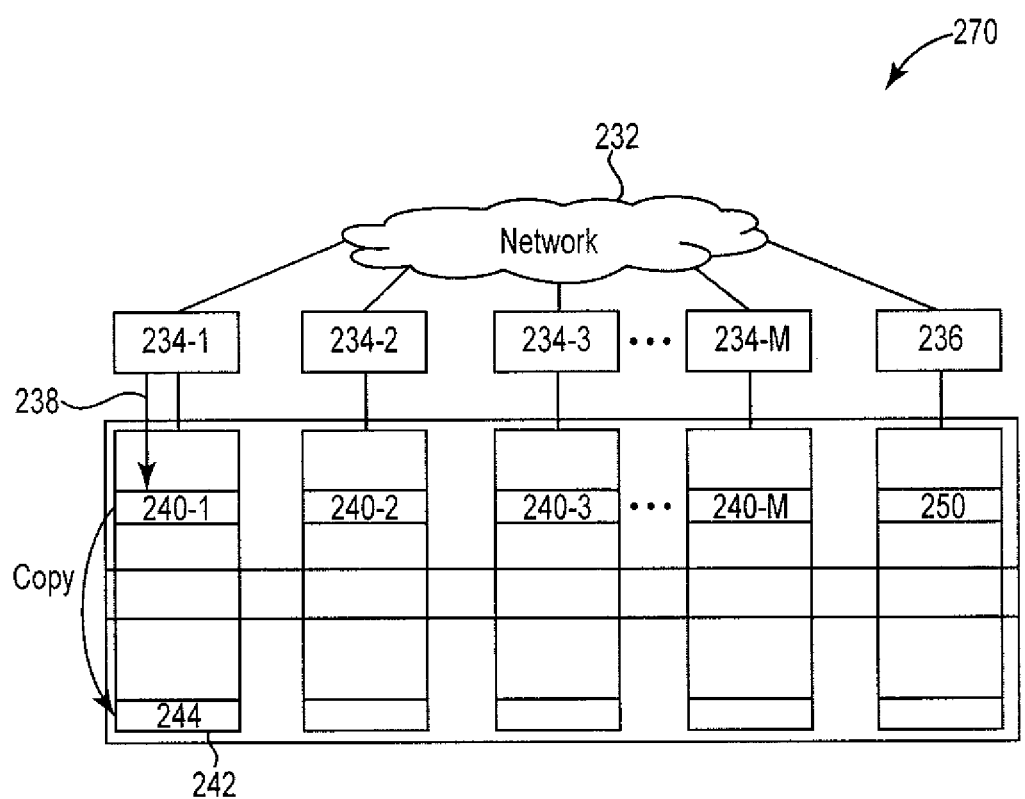
FIG. 2 illustrates a diagram of an example of a system for computing system reliability according to the present disclosure.

FIG. 2 illustrates a diagram of an example of a system 270 for computing system reliability according to the present disclosure. A number of devices (e.g., processors, computing devices, nodes, etc.) 234-1, 234-2, 234-3 . . . 234-M can be connected via a network 232. Network 232 can include a local area network (LAN), a wide area network (WAN), a personal area network (PAN), and the Internet, among other examples of networks. Each node 234-1 . . . 234-M can contain data 240-1, 240-2, 240-3 . . . 240-M written to its main memory. At 236, an XOR parity node is available to the system and is connected to the other nodes via the network 232. The data 250 in the memory of the parity node 236 can contain the data of various nodes and checkpoints. (e.g., local checkpoint data 244 XOR data 240-2 XOR data 240-3 XOR . . . XOR data 240-M). In an example, at node 234-1, data 240-1 is written into memory. At that point, a local checkpoint 244 can be constructed and stored in a log buffer 242 in a different portion of the main memory.

In an example, node 234-1 fails. In response, the computing system recovers checkpoint 244, and the node returns to its state at the point the checkpoint 240-2 was constructed. In another example, node 234-2 fails. In response, the computing system uses the information in checkpoint 244, data 240-3 . . . 240-M written into the memories of nodes 243-3 . . . 234-M, and the parity node 236 to reconstruct the data lost by the node 234-2 failure. The data can be put on a new node, or it can be put back onto node 234-2 when the node 234-2 recovers. This can be referred to as "rollback" because the system is returning to a previous state.

Figure 3:
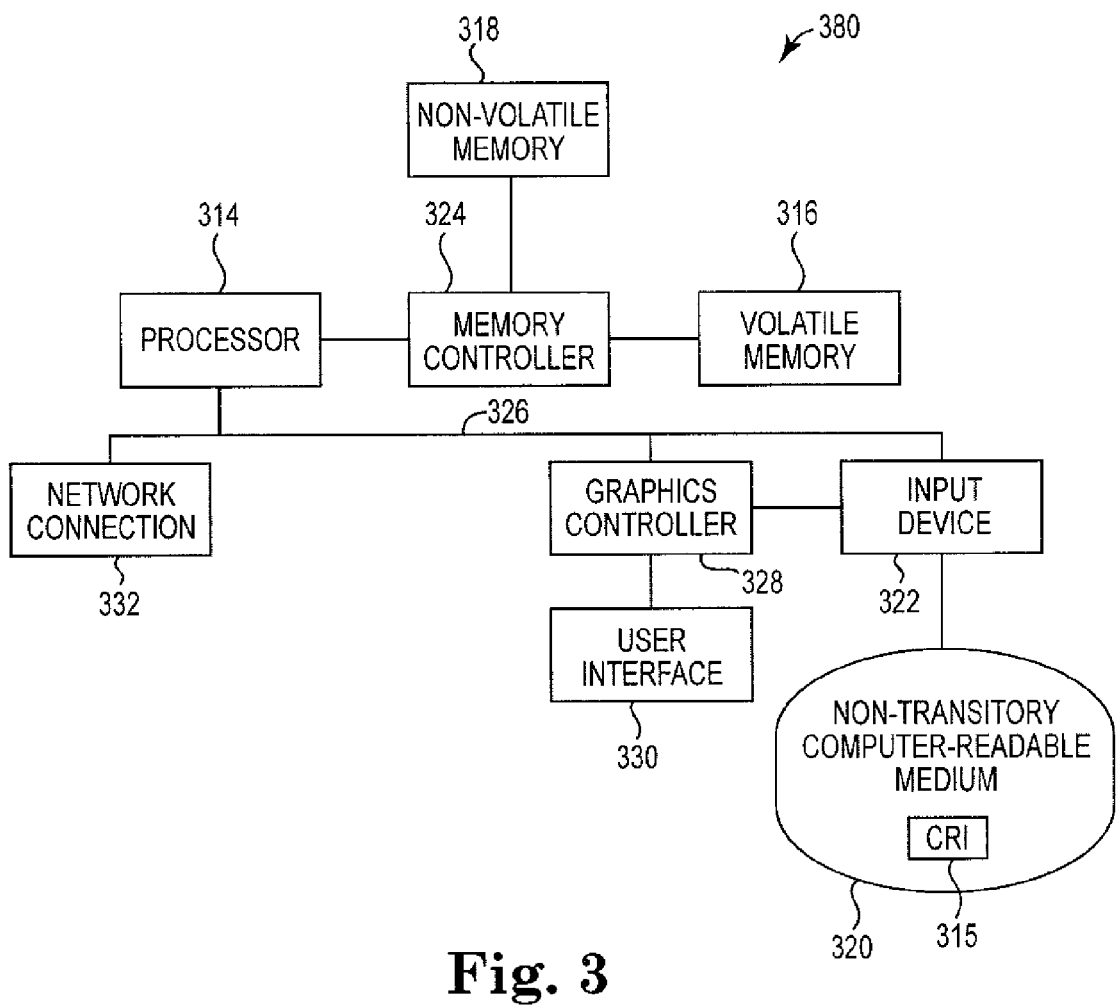
FIG. 3 illustrates a block diagram of an example of a computing system for computing system reliability according to the present disclosure.

FIG. 3 illustrates a block diagram of an example of a computing system 380 for computing system reliability according to the present disclosure. However, examples of the present disclosure are not limited to a particular computing system configuration. The system 380 can include processor resources 314 and memory resources (e.g., volatile memory 316 and/or non-volatile memory 318) for executing instructions stored in a tangible non-transitory medium (e.g., volatile memory 316, non-volatile memory 318, and/or computer-readable medium 320) and/or an application specific integrated circuit (ASIC) including logic configured to perform various examples of the present disclosure. Volatile memory 316 and non-volatile memory 318 can be examples of computer-readable media. A computer (e.g., a computing device) can include and/or receive a tangible non-transitory computer-readable medium 320 storing a set of computer-readable instructions (e.g., software) via an input device 322. As used herein, processor resources 314 can include one or a plurality of processors such as in a parallel processing system. Memory resources can include memory addressable by the processor resources 314 for execution of computer-readable instructions. The computer-readable medium 320 can include volatile and/or non-volatile memory such as random access memory (RAM), magnetic memory such as a hard disk, floppy disk, and/or tape memory, a solid state drive (SSD), flash memory, phase change memory, etc. In some examples, the non-volatile memory 318 can be a database including a plurality of physical non-volatile memory devices. In various examples, the database can be local to a particular system or remote (e.g., including a plurality of non-volatile memory devices 318). A computing device having processor resources can be in communication with, and/or receive a tangible non-transitory computer readable medium (CRM) 320 storing a set of computer readable instructions 315 (e.g., software) for a method for computing system reliability, as described herein.

The processor resources 314 can control the overall operation of the system 380. The processor resources 314 can be connected to a memory controller 324, which can read and/or write data from and/or to volatile memory 316 (e.g., RAM). The memory controller 324 can include an ASIC and/or a processor with its own memory resources (e.g., volatile and/or non-volatile memory). The volatile memory 316 can include one or a plurality of memory modules (e.g., chips).

The processor resources 314 can be connected to a bus 326 to provide for communication between the processor resources 314, and other portions of the system 380. The bus 326 can connect the processor resources 314 to the graphics controller 328, input device 322, and/or the network connection 332, among other portions of the system 100. The non-volatile memory 318 can be located in parallel to volatile memory 316, or it can replace volatile memory. In another example, the non-volatile memory 318 can be connected to the processor resources 314 via the bus 326. The non-volatile memory 318 can provide persistent data storage for the system 380. The graphics controller 328 can connect to a user interface 330, which can provide an image to a user based on activities performed by the system 380. Examples of a network connection can include a local area network (LAN), a wide area network (WAN), a personal area network (PAN), and the Internet, among other examples of networks.

Each system can include a computing device including control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g. non-transitory computer-readable medium 320). The non-transitory computer-readable medium can be integral, or communicatively coupled, to a computing device, in either in a wired or wireless manner. For example, the non-transitory computer-readable medium 320 can be an internal memory, a portable memory, a portable disk, or a memory located internal to another computing resource (e.g., enabling the computer-readable instructions to be downloaded over the Internet). The non-transitory computer-readable medium 320 can have computer-readable instructions 315 stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), Blu-Ray Discs, compact discs (CD), laser discs, and magnetic media such as tape drives, floppy discs, and hard drives, solid state media such as flash memory, EEPROM, phase change random access memory (PCRAM), as well as other types of computer-readable media.

Figure 4:
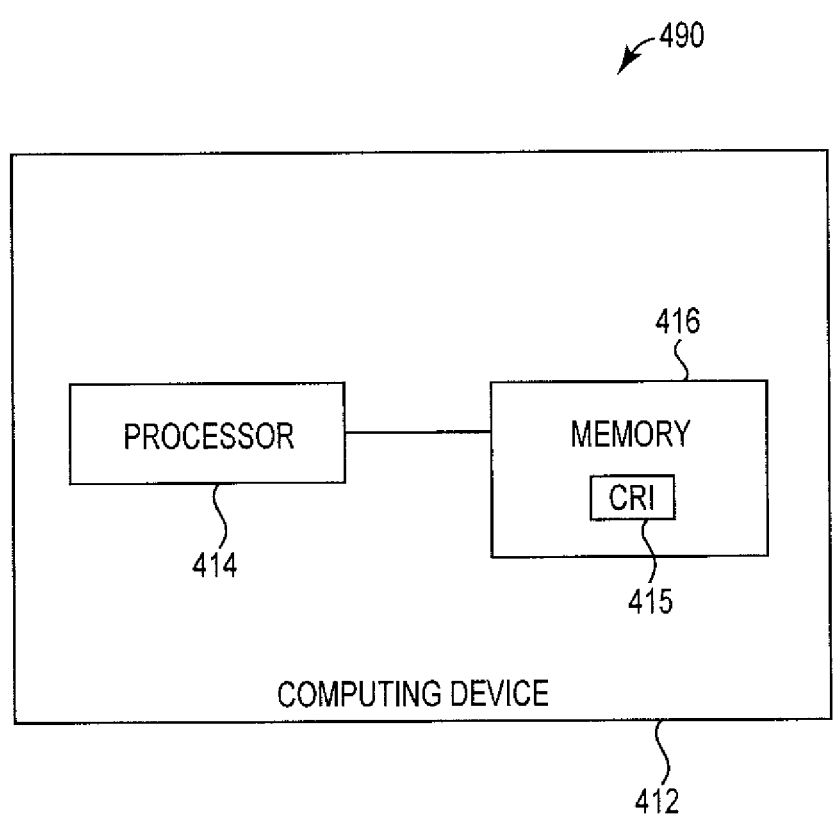
FIG. 4 illustrates a diagram of an example of a system for computing system reliability according to the present disclosure.

FIG. 4 illustrates a diagram of an example of a system 490 for computing system reliability according to the present disclosure. The system 490 can include a computing device 412 including a processor 414 coupled to a memory 416 (e.g., volatile memory and/or non-volatile memory). The memory 416 can include computer-readable instructions (e.g., software) 415 for a method of computing system reliability according to the present disclosure. In an example, the processor 414 coupled to the memory 416 can store, on a first one of a plurality of computing devices, a first checkpoint of a current state associated with the first one of the plurality of computing devices. In an example, the processor 414 can also store, on a second one of the plurality of computing devices, a second checkpoint of a current state associated with the second one of the plurality of computing devices.

The processor 414 coupled to the memory 416 can store the first and second checkpoints in a RAID across the plurality of devices. The processor 414 can also receive a first update for the plurality of computing devices and store that update in a database. The processor 414 can receive a second update, which the processor can aggregate with the first update. The processor can send the aggregate to the RAID across the plurality of devices.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A computer-implemented method for computing system reliability comprising:
   storing, on one of a plurality of devices, a checkpoint of a current state associated with the one of the plurality of devices;
   storing the checkpoint in an erasure-code group across the plurality of devices,
   wherein the erasure-code group includes a RAID;
   aggregating updates of the plurality of devices into one commit operation aggregate; and
   sending the commit operation aggregate by:
   scanning the checkpoint and associated new data;
   generating a packet of information associated with old data and the new data;
   sending the packet to parity nodes in the erasure-code group;
   receiving an acknowledgement from the erasure-code group; and
   disposing of the checkpoint in response to the receipt of acknowledgement.

2. The method of claim 1, further comprising sending the commit operation aggregate when committing a logical transaction.

3. The method of claim 1, further comprising sending the commit operation aggregate during software synchronization points.

4. The method of claim 1, further comprising reducing a size of the commit operation aggregate by excluding temporary data in stack or heap using a flag in a page table entry.

5. The method of claim 1, further comprising reducing a size of the commit operation aggregate by bulk transfer with a group update to amortize meta-data overhead.

6. The method of claim 1, further comprising reducing a size of the commit operation aggregate using hardware assist and excluding an unmodified fraction of a cache line.

7. A system for computing system reliability, comprising:
a plurality of computing devices in communication with each other to:
store, on a first one of the plurality of computing devices, a first checkpoint of a current state associated with the first one of the plurality of computing devices;
store, on a second one of the plurality of computing devices, a second checkpoint of a current state associated with the second one of the plurality of computing devices;
store the first and second checkpoints in an erasure-code group across the plurality of devices;
receive a first update for the plurality of computing devices;
store the first update in a database;
receive a second update for the plurality of computing devices;
aggregate the first update and the second update; and
send the aggregate to the erasure-code group across the plurality of devices.

8. The system of claim 7 wherein the erasure-code group includes at least one of a striping technique and a mirroring technique.

9. A computer-readable non-transitory medium storing a set of instructions for computing system reliability executable by the computer to cause the computer to:
receive a write to a data as part of a checkpoint of a current state associated with one of the plurality of devices;
store the data as part of the checkpoint on the one of a plurality of devices;
store the data as part of the checkpoint in a RAID across the plurality of devices;
allow the write;
commit an update to the RAID;
receive a first failure at the one of the plurality of devices;
recover the stored data as part of the checkpoint in response to the first failure;
receive a second failure at each of the plurality of devices; and
reconstruct each of the plurality of devices in response to the second failure.

10. The medium of claim 9 wherein the first and second failures are at least one of rack-level failures, socket-level failures, and server-level failures.

11. The medium of claim 10 wherein at least one of the first and second failures is a transient failure.

12. The medium of claim 10 wherein at least one of the first and second failures is a permanent failure.

\* \* \* \* \*